(12) United States Patent
Brown et al.

(10) Patent No.: US 8,185,632 B2
(45) Date of Patent: May 22, 2012

(54) DISCOVERY OF A GENERIC DEVICE IN A NON-LINEAR DISCOVERY FRAMEWORK

(75) Inventors: Eric Wade Brown, Cary, NC (US); Nicholas Watkins Brown, Cary, NC (US); Jacob Andrew Kitchener, Raleigh, NC (US); Heather Nicole Sterling, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 12/403,104

(22) Filed: Mar. 12, 2009

(65) Prior Publication Data

US 2010/0235510 A1    Sep. 16, 2010

(51) Int. Cl.
G06F 15/173  (2006.01)
H04L 12/28  (2006.01)

(52) U.S. Cl. ......... 709/226; 709/220; 709/223; 370/254

(58) Field of Classification Search .................. 709/226, 709/220, 223; 370/254
See application file for complete search history.

(56) References Cited

U.S. PATENT DOCUMENTS

| | | | |
|---|---|---|---|
| 5,745,897 A * | 4/1998 | Perkins et al. ........................ 1/1 |
| 5,845,081 A | 12/1998 | Rangarajan et al. ..... 395/200.54 |
| 5,948,055 A | 9/1999 | Pulsipher et al. ............. 709/202 |
| 5,970,482 A | 10/1999 | Pham et al. ...................... 706/16 |
| 6,182,136 B1 | 1/2001 | Ramanathan et al. ........ 709/224 |
| 6,336,138 B1 | 1/2002 | Caswell et al. ............... 709/223 |
| 6,834,303 B1 | 12/2004 | Garg et al. .................... 709/224 |
| 7,107,284 B1 | 9/2006 | Betz et al. .................. 707/104.1 |
| 7,274,704 B1 | 9/2007 | Ould-Brahim et al. ....... 370/409 |
| 7,342,893 B2 | 3/2008 | Barkai et al. .................. 370/245 |
| 2002/0174198 A1* | 11/2002 | Halter ............................ 709/220 |
| 2005/0068953 A1 | 3/2005 | Benjamin ..................... 370/389 |
| 2006/0136585 A1* | 6/2006 | Mayfield et al. .............. 709/224 |
| 2010/0046395 A1* | 2/2010 | Iyer et al. ....................... 370/254 |

OTHER PUBLICATIONS

RFC 3411 "An Architecture for Describing SNMP Management Frameworks" (Dec. 2002) to Harrington et al. ("Harrington").*
RFC 3412 "Message Processing and Dispatching for the Simple Network Management Protocol (SNMP)" (Dec. 2002) to Case et al. ("Case").*
RFC 3413 "Simple Network Management Protocol (SNMP) Applications" (Dec. 2002) to Levi et al. ("Levi").*
RFC 2741 "Agent Extensibility (AgentX) Protocol" (Jan. 2000) to Daniele et al. ("Daniele").*
NPL article 'Will Watson win Jeopardy?' by NOVA, pp. 5-6 (dated Jan. 20, 2011).*
NPL 'Post-Piagetian Constructivism for Grounded Knowledge Acquisition' by Harold Henry Chaput; American Association for Artificial Intelligence (Copyright 2000).*

* cited by examiner

*Primary Examiner* — Phuoc Nguyen
*Assistant Examiner* — June Sison
(74) *Attorney, Agent, or Firm* — Zilka-Kotab, PC

(57) ABSTRACT

In one embodiment, a method includes discovering a resource using a first discovery module, the first discovery module being for identifying resources having identifying information known to the first discovery module. The method also includes discovering the resource using a second discovery module, the second discovery module being for identifying resources having identifying information not known to the first discovery module. An object associated with the resource is created by the first discovery module if the resource has identifying information known to the first discovery module. In addition, an object associated with the resource is created by the second discovery module if the resource has identifying information not known to the first discovery module.

20 Claims, 2 Drawing Sheets

DISCOVERY OF A GENERIC DEVICE IN A NON-LINEAR DISCOVERY FRAMEWORK

BACKGROUND

The present invention relates to network management, and more particularly, this invention relates to network-level discovery of devices.

Many different conditions may cause a system to search for devices on a network. When performing a network-level discovery in a heterogeneous environment, it is often difficult to determine whether a discovered device should be represented using a generic model or a more specialized model. In many cases, with conventional discovery techniques, there is not a well-known or finite list of properties available at discovery time that can be used to determine whether a device is generic or not.

With conventional solutions, a generic object was only created once all other possible discovery options were exhausted. This sort of algorithm forces an application into a linear discovery model that has several limitations. First, it greatly increases the length of time between when the device is initially discovered and when the application object is actually created. Second, this sort of algorithm limits or excludes the ability to use multiple models to represent a particular device and does not allow a generic model to be created in addition to a specialized model, under certain conditions. Third, this sort of algorithm forces a single threaded discovery and does not allow distributing object discovery onto multiple servers.

A secondary problem associated with linear discovery techniques occurs when the well-known set of properties for a particular piece of hardware changes due to the emergence of new hardware or new software. Therefore, a solution that addresses the shortcomings of the linear discovery technique and also provides an easy way to update this set of properties in response to new technology would be highly advantageous.

SUMMARY

In one embodiment, a method includes discovering a resource using a first discovery module, the first discovery module being for identifying resources having identifying information known to the first discovery module. The method also includes discovering the resource using a second discovery module, the second discovery module being for identifying resources having identifying information not known to the first discovery module. An object associated with the resource is created by the first discovery module if the resource has identifying information known to the first discovery module. In addition, an object associated with the resource is created by the second discovery module if the resource has identifying information not known to the first discovery module.

In another embodiment, a computer program product includes a computer usable medium having computer usable program code embodied therewith. The computer usable program code comprises: a first discovery module for identifying resources having identifying information known to the first discovery module and a second discovery module for identifying resources having identifying information not known to the first discovery module. An object associated with the resource is created by the first discovery module if the resource has identifying information known to the first discovery module. Also, an object associated with the resource is created by the second discovery module if the resource has identifying information not known to the first discovery module.

A method, according to one embodiment, includes receiving identifying information of a resource discovered on a network and creating a known-resource-type object for the resource if the resource has identifying information correlating to an inclusion list of at least one known-resource-type discovery module. The method also includes creating a generic object associated with the resource if the resource has identifying information not in the inclusion list of at least one known-resource-type discovery module and the resource has identifying information not in an exclusion list of a generic discovery module.

In another embodiment, a computer program product includes a computer usable medium having computer usable program code embodied therewith. The computer usable program code comprises: computer usable program code configured to receive identifying information of a resource discovered on a network, to create a known-resource-type object for the resource if the resource has identifying information correlating to an inclusion list of at least one known-resource-type discovery module, and to create a generic object associated with the resource if the resource has identifying information not in the inclusion list of at least one known-resource-type discovery module and the resource has identifying information not in an exclusion list of an unknown-resource-type discovery module.

Other aspects and embodiments of the present invention will become apparent from the following detailed description, which, when taken in conjunction with the drawings, illustrate by way of example the principles of the invention.

DETAILED DESCRIPTION

Figure 1:
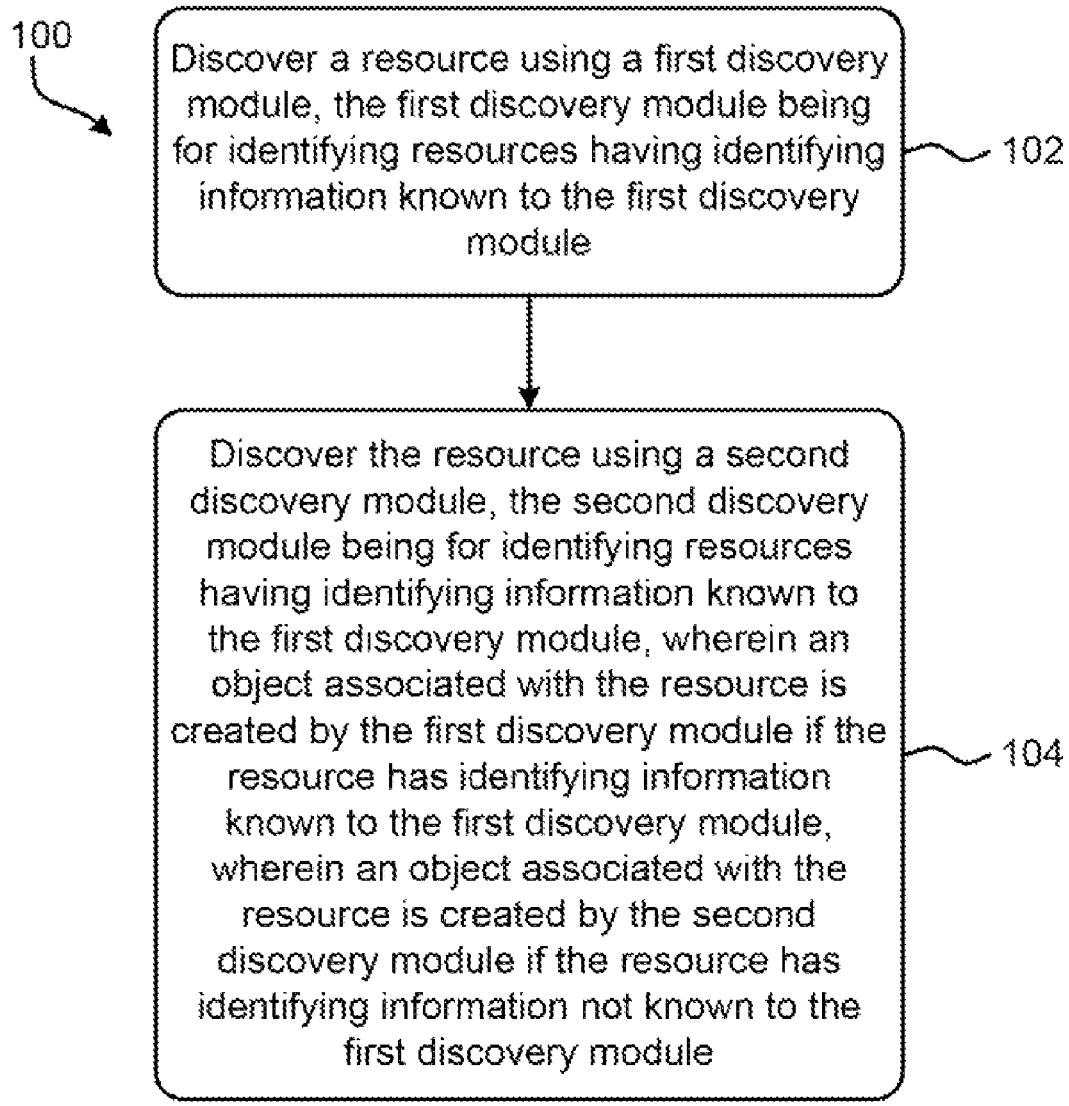
FIG. 1 shows a flow chart of a method according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based storage systems, as well as operation and/or component, parts thereof.

In one general embodiment, a method comprises discovering a resource using a first discovery module, the first discovery module being for identifying resources having identifying information known to the first discovery module; and discovering the resource using a second discovery module, the second discovery module being for identifying resources having identifying information not known to the first discovery module, wherein an object associated with the resource is created by the first discovery module if the resource has identifying information known to the first discovery module, wherein an object associated with the resource is created by the second discovery module if the resource has identifying information not known to the first discovery module.

In another general embodiment, a computer program product comprises a computer usable medium having computer usable program code embodied therewith, the computer usable program code comprising: a first discovery module for identifying resources having identifying information known to the first discovery module; and a second discovery module for identifying resources having identifying information not known to the first discovery module, wherein an object associated with the resource is created by the first discovery module if the resource has identifying information known to the first discovery module, wherein an object associated with the resource is created by the second discovery module if the resource has identifying information not known to the first discovery module.

In another general embodiment, a method comprises receiving identifying information of a resource discovered on a network; creating a known-resource-type object for the resource if the resource has identifying information correlating to an inclusion list of at least one known-resource-type discovery module; and creating a generic object associated with the resource if the resource has identifying information not in the inclusion list of at least one known-resource-type discovery module and the resource has identifying information not in an exclusion list of a generic discovery module.

In yet another general embodiment, a computer program product comprises a computer usable medium having computer usable program code embodied therewith, the computer usable program code comprising: computer usable program code configured to receive identifying information of a resource discovered on a network; computer usable program code configured to create a known-resource-type object for the resource if the resource has identifying information correlating to an inclusion list of at least one known-resource-type discovery module; and computer usable program code configured to create a generic object associated with the resource if the resource has identifying information not in the inclusion list of at least one known-resource-type discovery module and the resource has identifying information not in an exclusion list of an unknown-resource-type discovery module.

Before describing the invention in detail, some definitions are presented to clarify their use in the description of the invention. SNMP (Simple Network Management Protocol) is a common management protocol for a variety of hardware. It is also used to discover endpoints. OID (Object Identifier) in the case of SNMP, this information is available as part of an SNMP response and can be used to identify the type of hardware. Managed endpoint\Managed object may be any network-level resource. An application object is the application-level representation of a network-level device.

According to some preferred embodiments, IBM Director 6.1 or later may use methods disclosed herein to determine what type of endpoint to create when it discovers a system through SNMP. Several types of hardware may be discovered using SNMP, including operating systems, switches, printers, etc. The former two types each have a specific application model they are based on. The latter type falls into the generic SNMP device model.

IBM Director uses a non-linear discovery framework. There is a discovery module for each type of hardware that can be discovered. This module contains code to locate a system on the network, as well as to create the application object. The discovery service kicks off all of these modules simultaneously to discover everything on a network, such as a customer's network.

The Operating System Discovery Module has a configuration that specifies the list of well-known Operating System OIDs as inclusion parameters and specifies no exclusion parameters. Similarly, the Switch Discovery Module has a configuration that specifies the list of well-known Switch OIDs as inclusion parameters and specifies no exclusion parameters. The generic SNMP Device Discovery Module has a very different configuration; it specifies no inclusion parameters but specifies the aggregation of all other discovery module inclusion OIDs as its exclusion parameter.

For example, consider several different discovery scenarios.

Scenario A—An SNMP printer is discovered by the three modules in the following order: Operating System, Switch, Generic Device. The Operating System Discovery Module receives a packet with an OID that is not in its inclusion parameters. The Operating System Discovery Module ignores the packet and keeps running. The Switch Discovery Module receives a packet with an OID that is not in its inclusion parameters. The Switch Discovery Module ignores the packet and keeps running. The Generic Device Discovery Module receives a packet with an OID that is not in its exclusion parameters. The Generic Device Discovery Module immediately knows this object is not represented by a special application object and creates a generic device object.

Scenario B—An SNMP printer is discovered by the three modules in the following order: Generic Device, Operating System, Switch. The Generic Device Discovery Module receives a packet with an OID that is not in its exclusion parameters. The Generic Device Discovery Module immediately knows this object is not represented by a special application object and creates a generic device object. The Operating System Discovery Module receives a packet with an OID that is not in its inclusion parameters. The Operating System Discovery Module ignores it and keeps running. The Switch Discovery Module receives a packet with an OID that is not in its inclusion parameters. The Switch Discovery Module ignores it and keeps running.

It is evident from these scenarios that the behavior of each module may be uniform regardless of the timing. Also, the application object is created immediately upon initial discovery. Therefore, the only limiting factor on the object creation time is how quickly a module can get a response from the network.

Now consider the following example: a new Operating System is introduced. According to some embodiments, only two modifications have to be made in order to continue working properly: The Operating System inclusion parameters are updated to add the new Operating System OID, and the Generic Device exclusion parameters are updated to add the new Operating System OID.

Now consider an example where a new type of SNMP-enabled hardware is introduced. According to some embodiments, a new module can extend the exclusion list for the Generic Device by defining a new property containing the new module's specific OID inclusions. In this way, any piece of this new hardware would not be created using the generic device model.

FIG. 1 illustrates a method 100 according to one embodiment. The method 100 may be used in any desired environment, including but not limited to implementation in a computer system, computer network, computer readable media, etc.

In operation 102, a resource is discovered using a first discovery module, the first discovery module being for identifying resources having identifying information known to the first discovery module.

In operation 104, the resource is discovered using a second discovery module, the second discovery module being for identifying resources having identifying information not known to the first discovery module, wherein an object associated with the resource is created by the first discovery module if the resource has identifying information known to the first discovery module, wherein an object associated with the resource is created by the second discovery module if the resource has identifying information not known to the first discovery module.

The method 100 may be included in a computer program product, according to one embodiment, where the computer program product may comprise a computer usable medium having computer usable program code embodied therewith. The computer usable program code may comprise a first discovery module for identifying resources having identifying information known to the first discovery module and a second discovery module for identifying resources having identifying information not known to the first discovery module. According to some embodiments, an object associated with the resource may be created by the first discovery module if the resource has identifying information known to the first discovery module, and an object associated with the resource may be created by the second discovery module if the resource has identifying information not known to the first discovery module.

Note that while various embodiments are described with reference to modules, it should be understood that the modules refer primarily to sets of functionality that may be performed by a single software or hardware module, discrete software or hardware modules, or separate modules having some overlapping coding and/or functionality. Accordingly, the present invention is not to be limited to discrete modules only.

In some embodiments of method 100, the first discovery module may ignore the identifying information of the resource if the identifying information is not known to the first discovery module. This may conserve computing power and resource time, thereby allowing the method 100 to execute using less computing resources and without occupying as many I/O resources. Also, the first discovery module may include multiple discovery modules for identifying resources of different types such as an operating system discovery module, a switch discovery module, etc.

In some other embodiments of method 100, the resource may be a network resource, wherein the first discovery module is selected from a group consisting of an operating system discovery module and a switch discovery module.

In some approaches, the first discovery module may have an inclusion list of identifying information known thereto, wherein the first discovery module compares identifying information of the resource to the identifying information in the inclusion list for determining whether to create the object. For example, if the inclusion list includes a P3005 printer, and the resource is identified as a P3005 printer, then the first discovery module would create the object for the found printer. In some additional approaches, the method 100 may further comprise updating the inclusion list with identifying information of a new resource that typically has not yet been installed and/or attached. The identifying information of a new resource may be received from a user, system device, etc., which may be generated automatically during installation of the new resource, manually created by the user, etc.

In more additional approaches, the second discovery module may have an exclusion list, wherein the second discovery module compares identifying information of the resource to the identifying information in the exclusion list for determining whether to create the object, wherein the second discovery module does not create an object if the identifying information of the resource matches the identifying information in the exclusion list. For example, if the exclusion list includes a P3005 printer, and the resource is identified as a P3005 printer, then the second discovery module would not create an object. This eliminates the chance that the second discovery module might replicate an object already created by the first discovery module. In some additional approaches, the exclusion list may include all entries in the inclusion list of the first discovery module, in addition, the method 100 may further comprise updating the exclusion list upon detecting an update of the inclusion list.

In some embodiments, the object may be created by the respective discovery module immediately upon initial discovery of the resource. Immediately in the context of this embodiment means as fast as is possible given the constraints of the environment (i.e., computing system, network, etc.) in which the method 100 is being executed.

In some additional embodiments, the discovery modules may operate across multiple servers, networks, computing systems, etc. This may allow for the computing resources to be distributed, resulting in reduced time needed to find the resources and create the objects. In addition, according to some embodiments, the first and second discovery modules may operate simultaneously, either on the same server, network, computing system, etc., or across multiple servers, networks, computing systems, etc.

Figure 2:
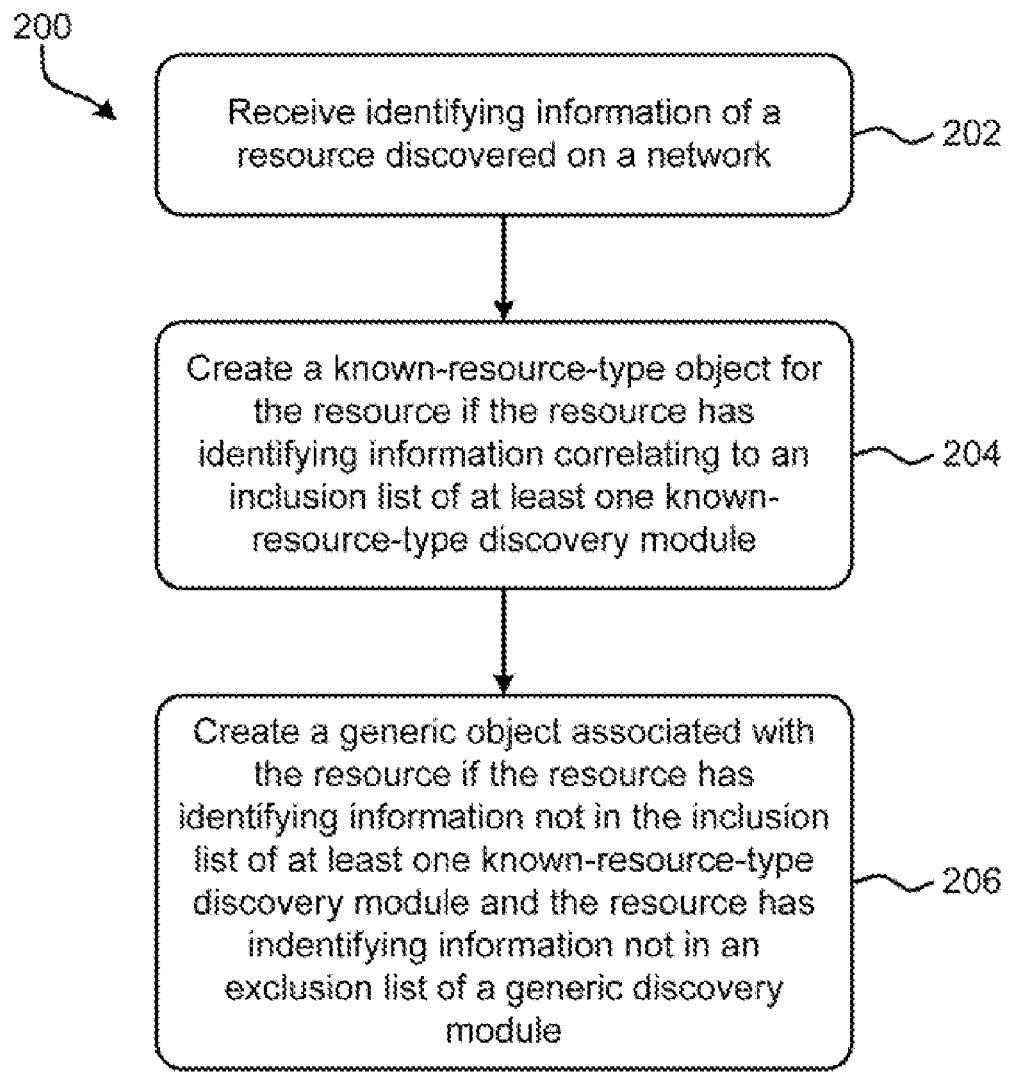
FIG. 2 shows a flow chart of a method according to another embodiment.

FIG. 2 illustrates a method 200 according to one embodiment. The method 200 may be used in any desired environment, including but not limited to implementation in a computer system, computer network, computer readable media, etc.

In operation 202, identifying information of a resource discovered on a network is received. In addition, the resource may be located on a computing system, server, wireless network, Internet, etc.

In operation 204, a known-resource-type object is created for the resource if the resource has identifying information correlating to an inclusion list of at least one known-resource-type discovery module. For example, if the resource found is a P3005 printer, and the P3005 printer has identifying information which correlates to a known-resource-type printer, then a known-resource-type object is created for the P3005 printer resource found.

In operation 206, a generic object associated with the resource is created if the resource has identifying information not in the inclusion list of at least one known-resource-type discovery module and the resource has identifying information not in an exclusion list of a generic discovery module. For example, if the resource found is a P3005 printer, and the P3005 printer has identifying information which does not correlate to a known-resource-type printer and is not in an exclusion list of a generic discovery module, then a generic printer object is created for the P3005 printer resource found.

The method 200 may be included in a computer program product, according to one embodiment, where the computer program product comprises a computer usable medium having computer usable program code embodied therewith. The computer usable program code may comprise computer usable program code configured to receive identifying information of a resource discovered on a network. In addition, the computer usable program code may comprise computer usable program code configured to create a known-resource-type object for the resource if the resource has identifying information correlating to an inclusion list of at least one known-resource-type discovery module. Also, the computer usable program code may comprise computer usable program code configured to create a generic object associated with the resource if the resource has identifying information not in the inclusion list of at least one known-resource-type discovery module and the resource has identifying information not in an exclusion list of an unknown-resource-type discovery module.

In some embodiments, method 200 may further comprise updating the inclusion list with identifying information of a new resource. This may allow for the inclusion list to have all current information relating to known resource types.

In some approaches, the exclusion list may include all entries in the inclusion list of the at least one known-resource-type discovery module. This may prevent duplicate objects from being created in case the generic discovery module is run prior to the known-resource-type discovery module. In some further approaches, method 200 may further comprise updating the exclusion list upon detecting an update of the inclusion list. This ensures that the two lists have the current information available and are in effect synchronized.

In some embodiments of method 200, the discovery modules may operate across multiple servers, networks, computing systems, etc. In addition, the discovery modules may operate simultaneously, either across multiple servers, networks, computing systems, etc., or on a single server, network, computing system, etc.

In some embodiments, the methods described above may be included in a computer program product, the computer program product including a computer usable medium having computer usable program code embodied therewith. The computer usable program code may comprise computer usable program code configured to determine a position of a currently-displayed area relative to a viewable area of an electronic document. The computer usable program code may further comprise computer usable program code configured to generate a graphical representation of the currently-displayed area relative to a viewable area of at least one page of the electronic document, and computer usable program code configured to output the graphical representation to a display device, the graphical representation being positioned in an immediate vicinity of a cursor associated with a user input device.

Another computer program product according to one embodiment may include a computer usable medium having computer usable program code embodied therewith. The computer usable program code may comprise computer usable program code configured for the following: to determine a position of a currently-displayed area relative to a viewable area of an electronic document having several tabbed pages; to generate a graphical representation of the currently-displayed area relative to a viewable area of at least two of the tabbed pages of the electronic document; and to output the graphical representation to a display device.

It will also be clear to one skilled in the art that the methodology of the present invention may suitably be embodied in a logic apparatus comprising logic to perform various steps of the methodology presented herein, and that such logic may comprise hardware components or firmware components.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

It will be appreciated that the methodology described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

Embodiments of the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Communications components such as input/output or I/O devices (including but not limited to keyboards, displays, pointing devices, etc.) can be coupled to the system either directly or through intervening I/O controllers, Communications components such as buses, interfaces, network adapters, etc. may also be coupled to the system to enable the data processing system, e.g., host, to become coupled to other data processing systems or remote printers or storage devices through intervening private or public networks. Modems, cable modem and Ethernet cards are just a few of the currently available types of network adapters.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
discovering a resource on a network using a first discovery module, the first discovery module being for identifying resources having identifying information known to the first discovery module;
receiving identifying information of the resource discovered; and
discovering the resource using a second discovery module, the second discovery module being for identifying resources having identifying information not known to the first discovery module,
wherein a known-resource-type object for the resource object associated with the resource is created by the first discovery module when the resource has identifying information correlating to an inclusion list of the first discovery module,
wherein a generic object associated with the resource is created by the second discovery module when the resource has identifying information not in the inclusion list of the first discovery module,
creating a known-resource-type object for the resource when the resource has identifying information; and
creating object associated with the resource when the resource has identifying information not in the inclusion list of at least one known-resource-type discovery module and the resource has identifying information not in an exclusion list of a generic discovery module.

2. The method of claim 1, wherein the first discovery module ignores the identifying information of the resource when the identifying information is not known to the first discovery module.

3. The method of claim 1, wherein the resource is a network resource, wherein the first discovery module is selected from a group consisting of an operating system discovery module and a switch discovery module.

4. The method of claim 1, wherein the first discovery module has an inclusion list of identifying information known thereto, wherein the first discovery module compares identifying information of the resource to the identifying information in the inclusion list for determining whether to create the object.

5. The method of claim 4, further comprising updating the inclusion list with identifying information of a new resource.

6. The method of claim 4, wherein the second discovery module has an exclusion list, wherein the second discovery module compares identifying information of the resource to the identifying information in the exclusion list for determining whether to create the object, wherein the second discovery module does not create an object when the identifying information of the resource matches the identifying information in the exclusion list.

7. The method of claim 6, wherein the exclusion list includes all entries in the inclusion list of the first discovery module.

8. A method, comprising:
discovering a resource using a first discovery module, the first discovery module being for identifying resources having identifying information known to the first discovery module;
discovering the resource using a second discovery module, the second discovery module being for identifying resources having identifying information not known to the first discovery module, wherein an object associated with the resource is created by the first discovery module when the resource has identifying information known to the first discovery module, wherein an object associated with the resource is created by the second discovery module when the resource has identifying information not known to the first discovery module; and
updating the exclusion list upon detecting an update of the inclusion list,
wherein the first discovery module ignores the identifying information of the resource when the identifying information is not known to the first discovery module,
wherein the resource is a network resource,
wherein the first discovery module is selected from a group consisting of an operating system discovery module and a switch discovery module, and
wherein the first and second discovery modules operate simultaneously.

9. The method of claim 1, wherein the object is created by the respective discovery module immediately upon initial discovery of the resource.

10. The method of claim 1, wherein the discovery modules operate across multiple servers.

11. The method of claim 1, wherein the first discovery module includes multiple discovery modules for identifying resources of different types.

12. The method of claim 1, wherein the first and second discovery modules operate simultaneously.

13. A computer program product, the computer program product comprising:
a non-transitory computer usable medium having computer usable program code embodied therewith, the computer usable program code comprising:
a first discovery module for identifying resources having identifying information known to the first discovery module;
a second discovery module for identifying resources having identifying information not known to the first discovery module, wherein an object associated with the resource is created by the first discovery module when the resource has identifying information known to the first discovery module, wherein an object associated with the resource is created by the second discovery module when the resource has identifying information not known to the first discovery module; and
updating the exclusion list upon detecting an update of the inclusion list,
wherein the first discovery module ignores the identifying information of the resource when the identifying information is not known to the first discovery module,
wherein the resource is a network resource,
wherein the first discovery module is selected from a group consisting of an operating system discovery module and a switch discovery module, and
wherein the first and second discovery modules operate simultaneously.

14. A method, comprising:
receiving identifying information of a resource discovered on a network;
creating a known-resource-type object for the resource when the resource has identifying information correlating to an inclusion list of at least one known-resource-type discovery module; and
creating a generic object associated with the resource when the resource has identifying information not in the inclusion list of at least one known-resource-type discovery module and the resource has identifying information not in an exclusion list of a generic discovery module.

15. The method of claim 14, further comprising updating the inclusion list with identifying information of a new resource.

16. The method of claim 14, wherein the exclusion list includes all entries in the inclusion list of the at least one known-resource-type discovery module.

17. The method of claim 15, further comprising updating the exclusion list upon detecting an update of the inclusion list.

18. The method of claim 14, wherein the discovery modules operate across multiple servers.

19. The method of claim 14, wherein the discovery modules operate simultaneously.

20. A computer program product, the computer program product comprising:

a non-transitory computer usable medium having computer usable program code embodied therewith, the computer usable program code comprising:
computer usable program code configured to receive identifying information of a resource discovered on a network;
computer usable program code configured to create a known-resource-type object for the resource when the resource has identifying information correlating to an inclusion list of at least one known-resource-type discovery module; and
computer usable program code configured to create a generic object associated with the resource when the resource has identifying information Snot in the inclusion list of at least one known-resource-type discovery module and the resource has identifying information not in an exclusion list of an unknown-resource-type discovery module.

* * * * *